(12) United States Patent
Mitchell (10) Patent No.: US 10,844,983 B2
(45) Date of Patent: Nov. 24, 2020

(54) TOP BAR COUPLING

(71) Applicant: Mueller International, LLC, Atlanta, GA (US)

(72) Inventor: Timothy J. Mitchell, Hixson, TN (US)

(73) Assignee: Mueller International, LLC, Atlanta, GA (US)

( * ) Notice: Subject to any disclaimer, the term of this patent is extended or adjusted under 35 U.S.C. 154(b) by 720 days.

(21) Appl. No.: 15/649,015

(22) Filed: Jul. 13, 2017

(65) Prior Publication Data

US 2019/0017637 A1 Jan. 17, 2019

(51) Int. Cl.
*F16L 21/06* (2006.01)
*F16L 21/00* (2006.01)

(52) U.S. Cl.
CPC ............. *F16L 21/06* (2013.01); *F16L 21/002* (2013.01)

(58) Field of Classification Search
CPC ................................ F16L 21/06; F16L 21/002
See application file for complete search history.

(56) References Cited

U.S. PATENT DOCUMENTS

| | | | |
|---|---|---|---|
| 703,657 A | 7/1902 | Horn | |
| 1,891,874 A * | 12/1932 | Elkins | F16L 21/08 403/378 |
| 2,980,143 A | 4/1961 | Harris | |
| 4,487,421 A | 12/1984 | Housas et al. | |
| 4,492,391 A * | 1/1985 | Haines | F16L 21/08 285/114 |
| 5,082,313 A * | 1/1992 | Bryant | F16L 21/04 285/15 |
| 5,507,533 A * | 4/1996 | Mumma | F16L 55/005 285/114 |
| 5,941,576 A | 8/1999 | Krausz | |
| 6,139,068 A * | 10/2000 | Burress | F16L 19/005 285/114 |
| 6,293,556 B1 | 9/2001 | Krausz | |
| 7,243,955 B2 | 7/2007 | Krausz | |

(Continued)

FOREIGN PATENT DOCUMENTS

DE 19810206 C1 * 5/1999 ............. F16L 17/04

OTHER PUBLICATIONS

Krausz USA; Brochure entitled: "HYMAX by Krausz Wide-Rage Coupling Solutions", publicly available prior to Jul. 13, 2017, 12 pgs.
HYMAX; Installation Instructions for Hymax and Hymax Long Body Coupling, publicly available prior to Feb. 28, 2018, 3 pgs.
HYMAX; Installation Instructions for Hymax Coupling, publicly available prior to Feb. 28, 2018, 1 pg.

(Continued)

*Primary Examiner* — James M Hewitt, II
(74) *Attorney, Agent, or Firm* — Taylor English Duma LLP (57) ABSTRACT

A top bar coupling includes a coupling body defining a first body end and a second body end; a first end ring attached to the first body end, the first end ring including a first gasket and a first split ring, the first gasket disposed within the first split ring, the first split ring configured to compress the first gasket radially inward in a tensioned state; a second end ring attached to the second body end, the second end ring including a second gasket and a second split ring, the second gasket disposed within the second split ring, the second split ring configured to compress the second gasket radially inward in a tensioned state; and a bar linkage attached to the first end ring and the second end ring, the bar linkage including a first bar; a second bar; and a attaching the first bar to the second bar.

20 Claims, 7 Drawing Sheets

(56) References Cited

U.S. PATENT DOCUMENTS

| | | |
|---|---|---|
| 7,571,940 B2 | 8/2009 | Krausz |
| 7,997,626 B2 | 8/2011 | Krausz |
| 8,448,993 B2 | 5/2013 | Cumic et al. |
| 8,528,945 B2 | 9/2013 | Bird et al. |
| 8,776,351 B2 | 7/2014 | Bird et al. |
| 8,789,832 B2 | 7/2014 | Gabert |
| 8,864,181 B2 | 10/2014 | Bird et al. |
| 9,310,002 B2 | 4/2016 | Chiproot et al. |
| 2003/0127858 A1 | 7/2003 | Chiproot et al. |
| 2006/0061090 A1 | 3/2006 | Krausz et al. |
| 2013/0193685 A1 | 8/2013 | Bird et al. |
| 2013/0331022 A1* | 12/2013 | Sandman ............... F16L 21/035 454/251 |
| 2014/0001709 A1 | 1/2014 | Chiproot |
| 2014/0319781 A1 | 10/2014 | Chiproot |
| 2015/0021910 A1 | 1/2015 | Bird et al. |
| 2017/0051854 A1 | 2/2017 | Bird |
| 2017/0059070 A1 | 3/2017 | Chiproot |
| 2019/0162341 A1* | 5/2019 | Chiproot ................ F16L 25/04 |
| 2019/0264845 A1 | 8/2019 | Mitchell et al. |

OTHER PUBLICATIONS

HYMAX; Installation Instructions for Hymax Large and X-Large Coupling and Long Body, publicly available prior to Feb. 28, 2018, 3 pgs.

HYMAX; Product Specifications for Hymax Coupling, publicly available prior to Feb. 28, 2018, 4 pgs.

Mitchell, Timothy J.; Applicant-Initiated Interview Summary for U.S. Appl. No. 15/908,137, filed Feb. 28, 2018, dated Jul. 15, 2020, 3 pgs.

Mitchell, Timothy J.; Non-Final Office Action for U.S. Appl. No. 15/908,137, filed Feb. 28, 2018, dated May 8, 2020, 19 pgs.

Mueller; Brochure for "Maxi-Range Pipe Couplings", Copyright 2008, 2 pgs.

Romac Industries, Inc.; Brochure for "Alpha Restrained Joint", published Dec. 7, 2016, 12 pgs.

Romac Industries, Inc.; Catalog for "Two-Bolt Wide Range Ductile Iron Coupling", published Jul. 1, 2017, 3 pgs.

Krausz Industries Ltd.; Installation instructions for "Hymax Grip Reducer", Nov. 9, 2016, 3 pgs.

Mitchell, Timothy J.; Notice of Allowance for U.S. Appl. No. 15/908,137, filed Feb. 28, 2018, dated Mar. 26, 2020, 10 pgs.

* cited by examiner

TOP BAR COUPLING

TECHNICAL FIELD

This disclosure relates to pipe couplings. More specifically, this disclosure relates to a pipe coupling for use with a wide range of pipe diameters.

BACKGROUND

Pipe couplings are commonly used to connect two pipe lengths together to form a pipe connection assembly, such as when installing a pipe system or pipe infrastructure. Some pipe couplings can be time consuming or difficult to install. For example, some pipe couplings require tightening of numerous bolts around the pipe coupling. The bolts often must be tightened in a pattern, such as a star pattern, to ensure that pressure from the bolts is evenly distributed over the pipe connection assembly to provide for a reliable and uniform seal. Uneven tightening of the bolts can cause a poor seal and leaking of the pipe connection assembly. Limited access, such as when installing a pipe connection assembly in a trench, can also make it difficult to access each of the individual bolts for tightening.

Additionally, many pipe couplings and gaskets of the pipe couplings can only accommodate a narrow range of pipe sizes. For example, a pipe coupling or gasket manufactured to American Society of Mechanical Engineers (ASME) standards may not be compatible with a pipe length manufactured to Japanese Industrial Standards (JIS). A 6" nominal pipe length manufactured to JIS can define an outside diameter of 165.2 mm while a 6" nominal pipe length manufactured to ASME standards can define an outside diameter of 168.3 mm. Many common pipe couplings and gaskets cannot tolerate the range of outside diameters between standards, nominal pipe sizes, excessive manufacturing tolerance, or ovality of the pipe lengths without developing leaks or failing to seal.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a top bar coupling comprising a coupling body defining a first body end and a second body end, a coupling bore defined extending through the coupling body from the first body end to the second body end; a first end ring attached to the first body end, the first end ring comprising a first gasket and a first split ring, the first gasket disposed within the first split ring, the first split ring defining a first ring end and a second ring end, the first split ring configured to compress the first gasket radially inward in a tensioned state; a second end ring attached to the second body end, the second end ring comprising a second gasket and a second split ring, the second gasket disposed within the second split ring, the second split ring defining a first ring end and a second ring end, the second split ring configured to compress the second gasket radially inward in a tensioned state; and a bar linkage attached to the first end ring and the second end ring, the bar linkage comprising a first bar, the first bar extending between the first ring end of the first end ring and the first ring end of the second end ring; a second bar, the second bar extending between the second ring end of the first end ring and the second ring end of the second end ring; and a tensioner, the tensioner attaching the first bar to the second bar, the tensioner configured to draw the first bar towards the second bar.

Also disclosed is a pipe connection assembly comprising a first pipe length; a second pipe length; a top bar coupling, the top bar coupling comprising a coupling body defining a first body end and a second body end, a coupling bore defined extending through the coupling body from the first body end to the second body end, the coupling bore receiving the first pipe length through the first body end, the coupling bore receiving the second pipe length through the second body end; a first end ring attached to the first body end, the first end ring securing the first pipe length to the coupling body; a second end ring attached to the second body end, the second end ring securing the second pipe length to the coupling body; and a bar linkage attached to the first end ring and the second end ring, the bar linkage comprising a first bar extending from the first end ring to the second end ring; a second bar extending from the first end ring to the second end ring; and a tensioner, the tensioner attaching the first bar to the second bar.

Also disclosed is a method of connecting a first pipe length to a second pipe length with a top bar coupling, the method comprising inserting an end of the first pipe length into a coupling bore of a coupling body of the top bar coupling, the coupling bore defined extending through the coupling body from a first body end to a second body end, the first pipe length extending through the first body end; and tensioning a tensioner of a bar linkage, the bar linkage comprising a first bar and a second bar, the first bar and the second bar each extending from the first body end to the second body end, the tensioner attaching the first bar to the second bar, tensioning the tensioner of the bar linkage comprising drawing the first bar towards the second bar; and compressing a gasket of a first end ring against an outer surface of the first pipe length to form a seal, the first end ring attached to the first body end, the first bar and the second bar attached to the first end ring.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a top bar coupling and associated methods, systems, devices, and various apparatus. The top bar coupling comprises a coupling body, a first end ring, a second end ring, and a bar linkage. It would be understood by one of skill in the art that the disclosed top bar coupling is described in but a few exemplary embodiments among many. No particular terminology or description should be considered limiting on the disclosure or the scope of any claims issuing therefrom.

Figure 1:
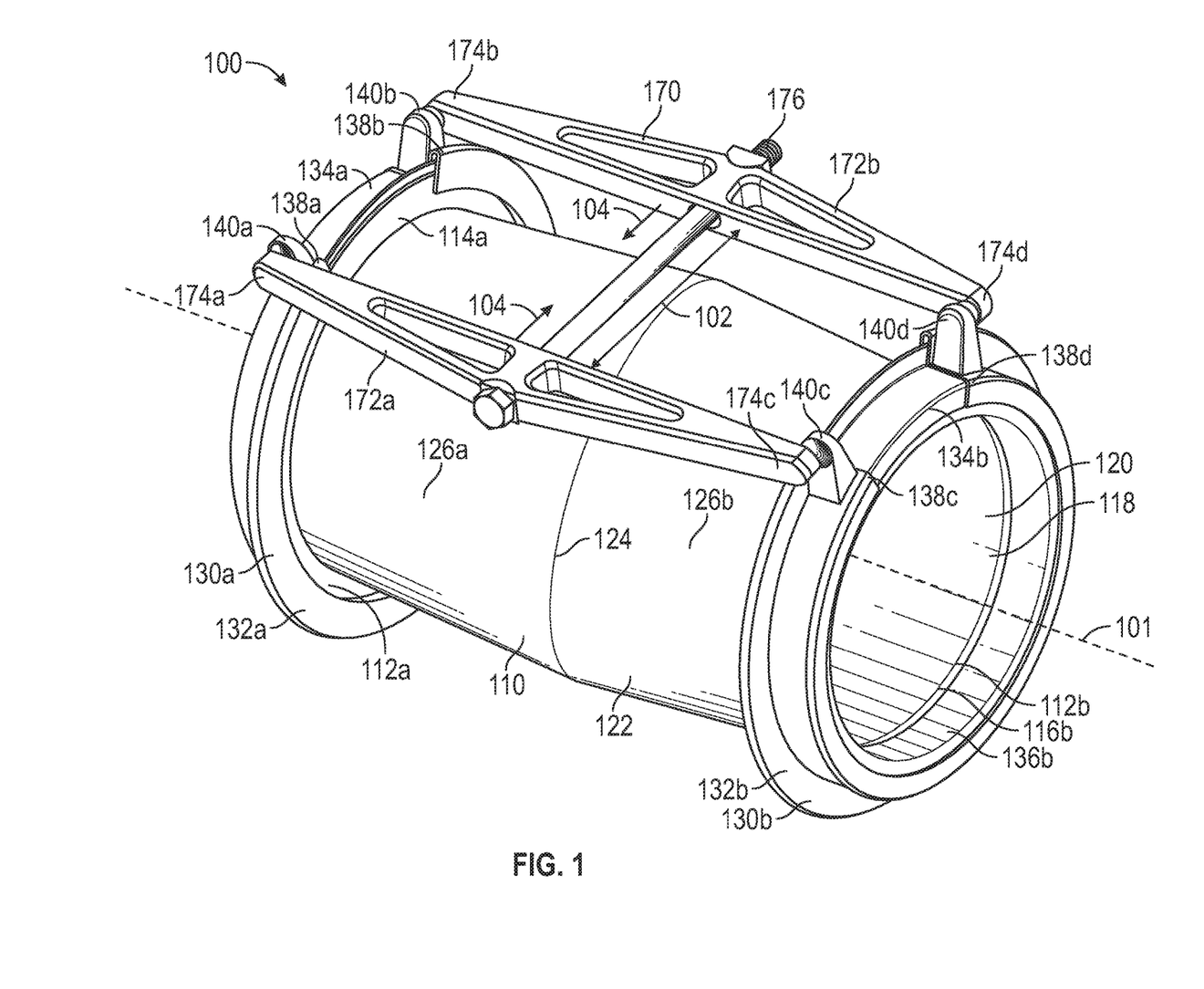
FIG. 1 is a perspective front view of a top bar coupling comprising a coupling body, a first end ring, a second end ring, and a bar linkage in accordance with one aspect of the present disclosure.

FIG. 1 shows a perspective front view of a top bar coupling 100 in accordance with one aspect of the present disclosure. The top bar coupling 100 can comprise a coupling body 110, a first end ring 130a, a second end ring 130b, and a bar linkage 170. The coupling body 110 can define a first body end 112a and a second body end 112b. The first body end 112a can be disposed opposite from the second body end 112b. The coupling body 110 can define an inner body surface 120 and an outer body surface 122. The inner body surface 120 can define a coupling bore 118 extending through the coupling body 110 from the first body end 112a to the second body end 112b. The coupling bore 118 can define a first bore opening 116a (shown in FIG. 3) at the first body end 112a and a second bore opening 116b at the second body end 112b.

In the present aspect, the coupling body 110 can define a substantially tubular shape, and the coupling bore 118 can define an axis 101. The coupling body 110 can define a first flange 114a disposed at the first body end 112a, and a second flange 114b (shown in FIG. 3) disposed at the second body end 112b. Each of the flanges 114a,b can extend radially outward from the coupling body 110. In the present aspect, the coupling body 110 can define a centerline 124 disposed at a midpoint between the first body end 112a and the second body end 112b. The centerline 124 can divide the coupling body 110 into a first portion 126a defined between the centerline 124 and the first body end 112a and a second portion 126b defined between the centerline 124 and the second body end 112b. In the present aspect, each of the first portion 126a and the second portion 126b can define a frustoconical shape which tapers from the centerline 124 towards the first body end 112a and the second body end 112b, respectively.

The first end ring 130a can be attached to the first body end 112a, and the second end ring 130b can be attached to the second body end 112b. Each end ring 130a,b can respectively comprise a split ring 132a,b, a gasket 136a,b (gasket 136a shown in FIG. 3) disposed within the respective split ring 132a,b, a bridge piece 134a,b and a pair of joint bases 140a,b,140c,d. In the present aspect, the split rings 132a,b can receive the respective flanges 114a,b to attach the end rings 130a,b to the respective body ends 112a,b.

The first split ring 132a can be shaped as a major arc extending about the axis 101, and the first split ring 132a can encircle a majority of a circumference of the first body end 112a. The first split ring 132a can define a first ring end 138a and a second ring end 138b. The first bridge piece 134a can circumferentially overlap the first ring end 138a and the second ring end 138b and extend between the first ring end 138a and the second ring end 138b. The first split ring 132a and the first bridge piece 134a can together completely encircle the circumference of the first body end 112a. A first joint base 140a of the joint bases 140a,b,c,d can be attached to the first ring end 138a, and a second joint base 140b of the joint bases 140a,b,c,d can be attached to the second ring end 138b. The joint bases 140a,b can extend substantially radially outward from the respective ring ends 138a,b with respect to the axis 101.

The second split ring 132b can also be shaped as a major arc extending about the axis 101, and the second split ring 132b can encircle a majority of a circumference of the second body end 112b. The second split ring 132a can define a first ring end 138c and a second ring end 138d. The second bridge piece 134b can circumferentially overlap the first ring end 138c and the second ring end 138d and extend between the first ring end 138c and the second ring end 138d. The second split ring 132b and the second bridge piece 134b can together completely encircle the circumference of the second body end 112b. A first joint base 140c of the joint bases 140a,b,c,d can be attached to the first ring end 138c, and a second joint base 140d of the joint bases 140a,b,c,d can be attached to the second ring end 138d. The joint bases 140c,d can extend substantially radially outward from the respective ring ends 138c,d with respect to the axis 101.

The bar linkage 170 can comprise a first bar 172a, a second bar 172b, and a tensioner 176. The tensioner 176 can attach the first bar 172a to the second bar 172b. The first bar 172a can define a first bar end 174a and a second bar end 174c disposed opposite from the first bar end 174a. The second bar 172b can define a first bar end 174b and a second bar end 174d disposed opposite from the first bar end 174b.

The tensioner 176 can attach to the first bar 172a at a point defined between the first bar end 174a and the second bar end 174c. The tensioner 176 can attach to the second bar 172b at a point defined between the first bar end 174b and the second bar end 174d. In the present aspect, the tensioner 176 can be disposed between the first end ring 130a and the second end ring 130b, and the tensioner 176 can substantially align with the centerline 124 of the coupling body 110. In the present aspect, the first bar 172a, the second bar 172b, and the tensioner 176 can substantially define an H-shape with the bars 172a,b forming the sides of the "H" and the tensioner 176 forming the cross-bar of the "H".

Each of the bars 172a,b can extend from the first split ring 132a at the first body end 112a to the second split ring 132b at the second body end 112b. The first bar end 174a of the first bar 172a can engage the first joint base 140a of the first split ring 132a, and the second bar end 174c can engage the first joint base 140c of the second split ring 132b. The first bar end 174b of the second bar 172b can engage the second joint base 140b of the first split ring 132a, and the second bar end 174d can engage the second joint base 140d of the second split ring 132b.

The tensioner 176 can control a position of the bar linkage 170 and a tension in each of the split rings 132a,b. Tensioning the tensioner 176 can draw the bars 172a,b together in a tensioning direction 104 which draws the first rings ends 138a,c towards the respective second ring ends 138b,d, thereby increasing the tension within the respective split rings 132a,b. Releasing the tensioner 176 can allow the bars 172a,b to move in a relaxing direction 102 which spreads the bars 172a,b further apart from one another which allows the first ring ends 138a,c and second rings ends 138b,d to spread apart, thereby relaxing the tension of the split rings 132a,b. Tensioning the tensioner 176 can place the bar linkage 170 in an engaged position which is described in further detail below with respect to FIG. 5. Releasing the tensioner 176 can place the bar linkage 170 in a disengaged position which is described in further detail below with respect to FIG. 2.

Figure 2:
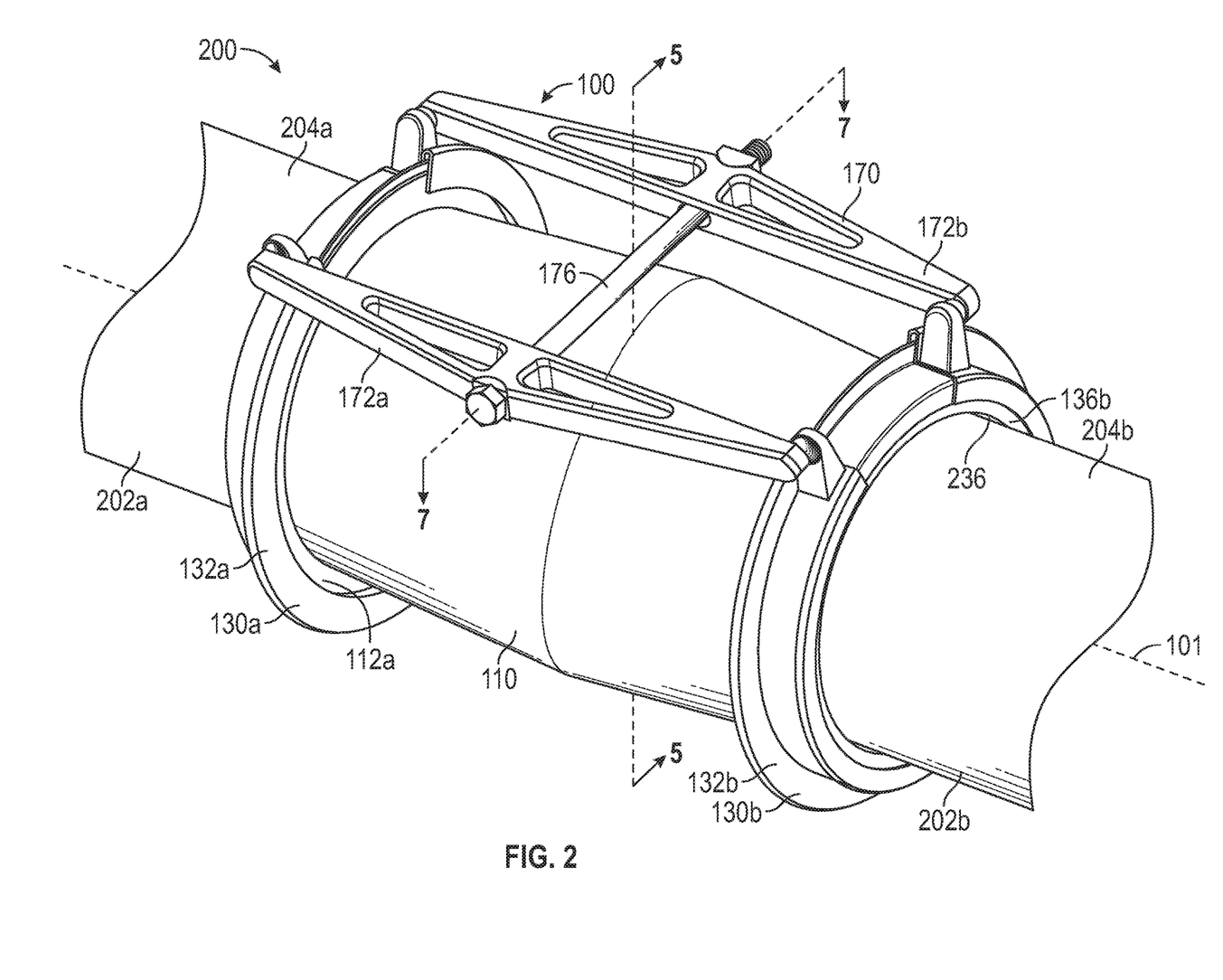
FIG. 2 is a perspective front view of a pipe connection in accordance with one aspect of the present disclosure comprising a first pipe length, a second pipe length, and the top bar coupling of FIG. 1.

FIG. 2 is a perspective front view of a pipe connection assembly 200 comprising a first pipe length 202a, a second pipe length 202b, and the top bar coupling 100 of FIG. 1. The first pipe length 202a can define a first outer pipe surface 204a. The second pipe length 202b can define a second outer pipe surface 204b. The first pipe length 202a can be inserted into the coupling body 110 through the first body end 112a, and the second pipe length 202b can be inserted into the coupling body 110 through the second body end 112b (shown in FIG. 3).

In the present aspect, the bar linkage 170 can be in the disengaged position, and the first pipe length 202a and the second pipe length 202b can be freely inserted or removed from the top bar coupling 100. In the disengaged position, the first split ring 132a and the second split ring 132b can each be in a relaxed state. In the relaxed state, the gaskets 136a,b (gasket 136a shown in FIG. 3) can each be uncompressed, and a gap 236 can be defined between the gaskets 136a,b and the respective pipe lengths 202a,b. The gaskets 136a,b may not form a seal with the outer pipe surfaces 204a,b, as shown by gasket 136b, when the gaskets 136a,b are uncompressed and the split rings 132a,b are in the relaxed state. Each split ring 132a,b can be resilient, and each split ring 132a,b can define a positional memory which biases the split rings 132a,b towards the relaxed state.

Figure 3:
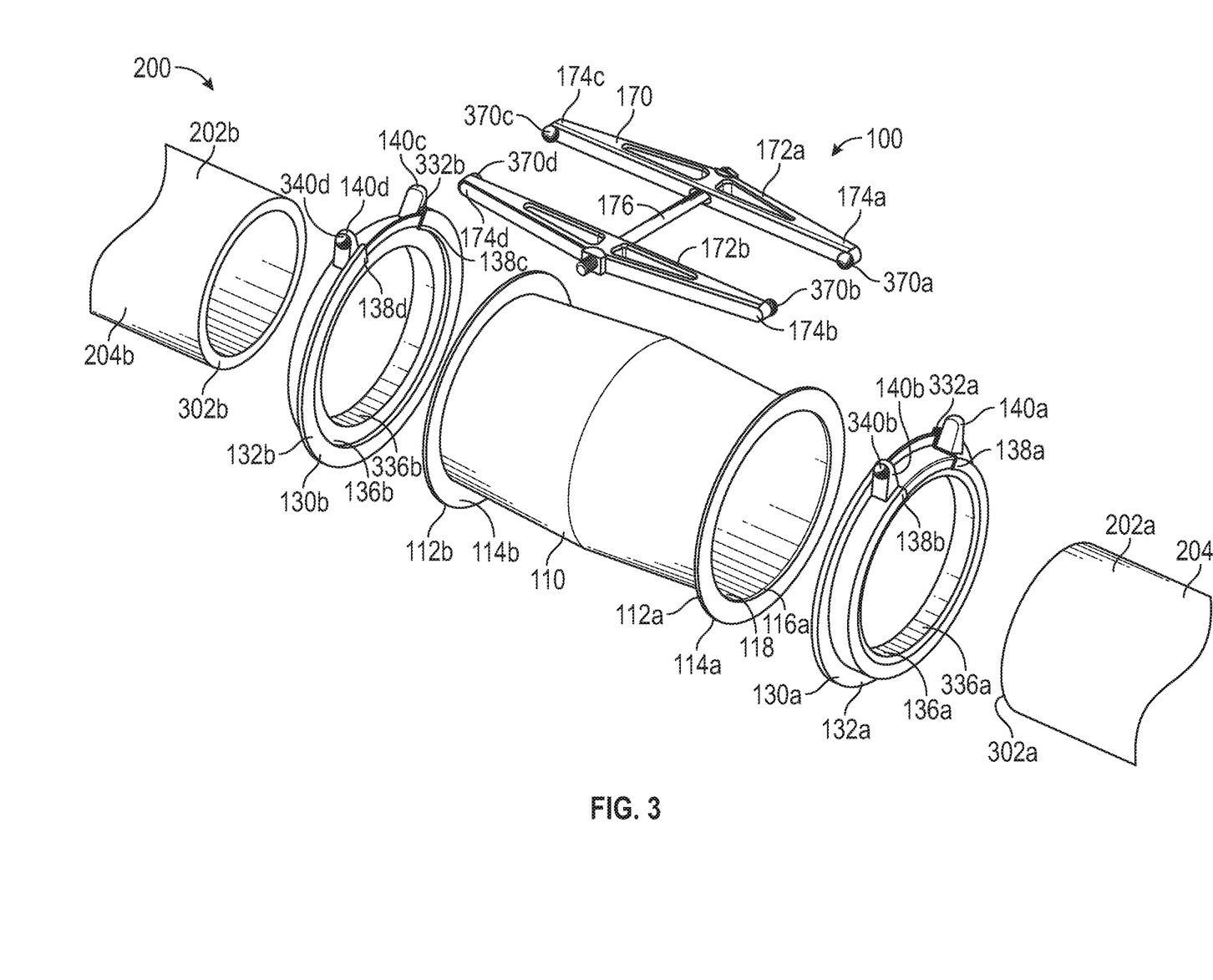
FIG. 3 is an exploded perspective rear view of the pipe connection assembly of FIG. 2.

FIG. 3 is an exploded rear view of the pipe connection assembly 200 of FIG. 2. In the present aspect, the first split ring 132a can define a groove 332a extending circumferentially around the first split ring 132a from the first ring end 138a to the second ring end 138b. The second split ring 132b can define a groove 332b extending circumferentially around the second split ring 132b from the first ring end 138c to the second ring end 138d.

Each groove 332a,b can be configured to receive a one of the flanges 114a,b of the coupling body 110 to secure the end ring 130a,b to the respective body ends 112a,b. The first ring ends 138a,c can be stretched away from the respective second ring ends 138b,d in order to provide clearance for the split rings 132a,b to slip over the respective flanges 114a,b and into the grooves 332a,b.

In the present aspect, the first bar 172a can define a ball 370a,c disposed at each bar end 174a,c, respectively. The second bar 172b can define a ball 370b,d disposed at each bar end 174b,d, respectively. Each joint base 140a,b,c,d can define a concave socket 340a,b,c,d, (concave sockets 340a,c shown in FIG. 7), respectively. The concave sockets 340a,b,c,d can each be configured to receive a different one of the balls 370a,b,c,d, respectively, to from a ball joint 740a,b,c,d (shown in FIG. 7). With the bar linkage 170 in the disengaged position, the bar linkage 170 can be attached to the end rings 130a,b by compressing the first ring ends 138a,c slightly towards the second ring ends 138b,d and engaging the balls 370a,b,c,d with the respective concave sockets 340a,b,c,d. Because of the concave shape of the concave sockets 340a,b,c,d, the balls 370a,b,c,d cannot slip out of the concave sockets 340a,b,c,d without compressing the first ring ends 138a,c towards the second ring ends 138b,d to provide clearance to remove the balls 370a,b,c,d from the respective sockets, thereby retaining the bar linkage 170 in place and attaching the bar linkage 170 to each end ring 130a,b. In some aspects, the joint bases 140a,b,c,d can define the balls 370a,b,c,d and the bars 172a,b can define the sockets 340a,b,c,d.

The first pipe length 202a can define a first pipe end 302a, and the second pipe length 202b can define a pipe end 302b. With the end rings 130a,b attached to the coupling body 110, the pipe ends 302a,b of the respective pipe lengths 202a,b can be inserted into the coupling bore 118 through the respective end rings 130a,b and bore openings 116a,b (second bore opening 116b shown in FIG. 1). Each gasket 136a,b can define a gasket bore 336a,b which can loosely fit over the outer pipe surface 204a,b of the respective pipe length 202a,b with the bar linkage 170 in the disengaged position and the split rings 132a,b in the relaxed state.

Figure 4:
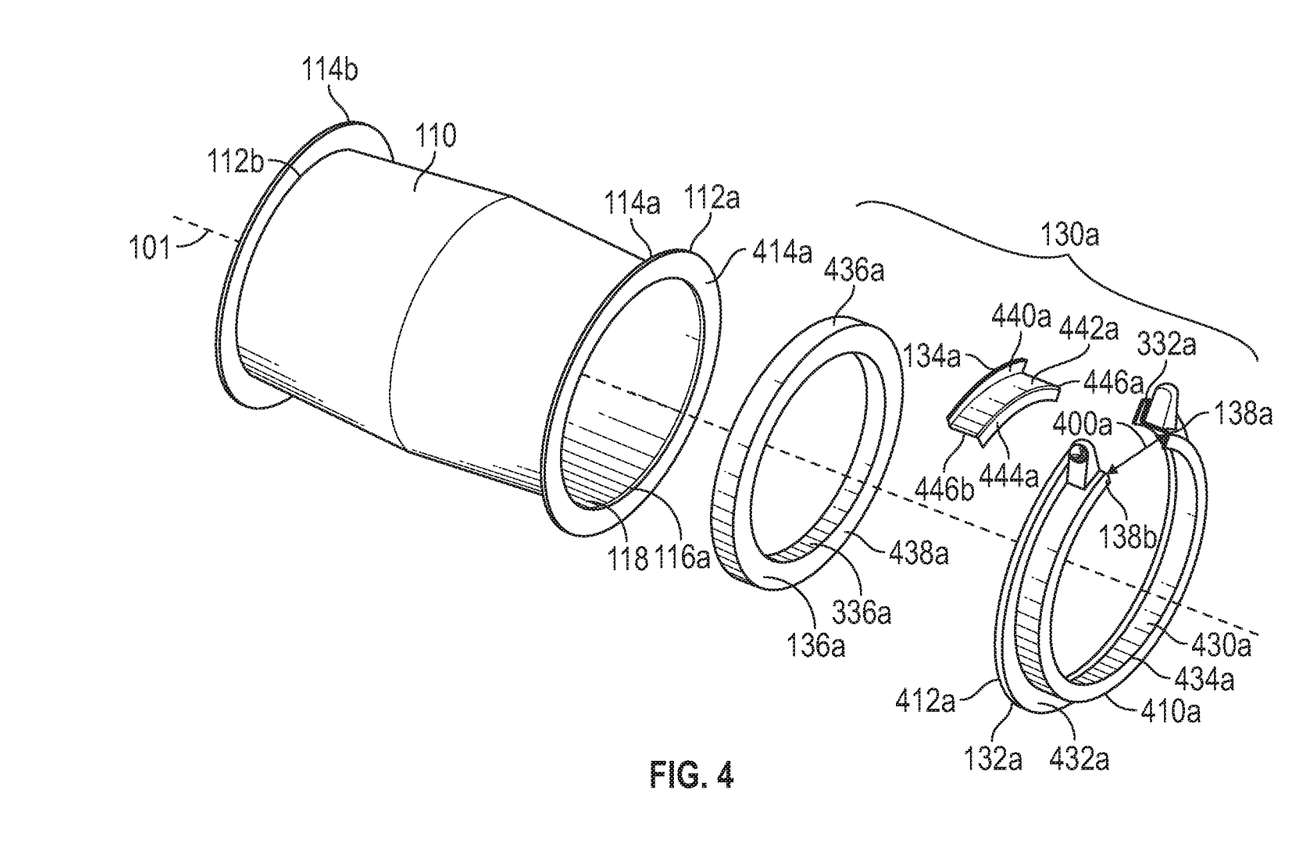
FIG. 4 is an exploded view of the first end ring and the coupling body of FIG. 1.

FIG. 4 is an exploded view of the first end ring 130a and coupling body 110. In the present aspect, the first end ring 130a can also be representative of structure defined in the second end ring 130b such that the first end ring 130a and the second end ring 130b are substantially similar to each other in structure and function. The flanges 114a,b of the coupling body 110 can each define an axially outer surface 414a,b (axially outer surface 414b shown in FIG. 5).

The split ring 132a can define an axially inner side 412a and an axially outer side 410a. The first split ring 132a can define an outer radial lip 432a, an arcuate portion 430a, and an inner radial shoulder 434a. The arcuate portion 430a can be defined between the outer radial lip 432a and the inner radial shoulder 434a. The outer radial lip 432a can be disposed at the axially inner side 412a, and the outer radial lip 432a can extend radially outward from the arcuate portion 430a with respect to the axis 101. The outer radial lip 432a be substantially U-shaped in cross-section, and the outer radial lip 432a can define the groove 332a. The inner radial shoulder 434a can be disposed at the axially outer side 410a, and the inner radial shoulder 434a can extend radially inward from the arcuate portion 430a with respect to the axis 101. The split ring 132a can define a gap 400a between the first ring end 138a and the second ring end 138b.

The bridge piece 134a can define a first end 446a and a second end 446b, and the first end 446a can be disposed opposite from the second end 446b. The bridge piece 134a can be wider than the gap 400a of the split ring 132a when the split ring 132a is in the relaxed state. The bridge piece 134a can define an arcuate portion 442a, an outer radial shoulder 440a, and an inner radial shoulder 444a. The arcuate portion 442a can be disposed between the outer radial shoulder 440a and the inner radial shoulder 444a. The arcuate portion 442a, the outer radial shoulder 440a, and the inner radial shoulder 444a can each extend from the first end 446a to the second end 446b. The outer radial shoulder 440a can extend radially outward from the arcuate portion 442a with respect to the axis 101. The inner radial shoulder 444a can extend radially inward from the arcuate portion 442 with respect to the axis 101.

In the present aspect, the gasket 136a can define an annular shape and a rectangular cross-section. In other aspects, the gasket 136a can define a different cross-sectional shape, such as triangular, round, trapezoidal, or any other suitable shape. In some aspects, the gasket 136a can define grooves or channels configured to facilitate compression of the gasket 136a. The gasket 136a, in some aspects, can also define internal features, such as a hole extending circumferentially through the gasket 136a between the gasket bore 336a and a gasket out surface 436a.

The gasket bore 336a can face radially inward with respect to the axis 101. The gasket 136a can define the gasket outer surface 436a disposed opposite from the gasket bore 336a, and the gasket outer surface 436a can face radially outward with respect to the axis 101. The gasket 136a can define an axially outer surface 438a and an axially inner surface 538a (shown in FIG. 5), each extending from the gasket bore 336a to the gasket outer surface 436a.

To assemble the first end ring 130a, the first bridge piece 134a can be inserted into the gap 400a defined between the first ring end 138a and the second ring end 138b to bridge the gap 400a. The bridge piece 134a can be wider than the gap 400a. Consequently, the first end 446a of the first bridge piece 134a can overlap the first ring end 138a, and the second end 446b of the first bridge piece 134a can overlap the second ring end 138b. The groove 332a can receive portions of the outer radial shoulder 440a disposed proximate to the ends 446a,b, and portions of the inner radial shoulder 444a disposed proximate to the ends 446a,b can be positioned in facing engagement with portions of the inner radial shoulder 434a disposed proximate to the ring ends 138a,b of the first split ring 132a. With the first bridge piece 134a bridging the gap 400a, the first bridge piece 134a and the first split ring 132a can define a substantially circular shape.

The first gasket 136a can be inserted into the first split ring 132a and the first bridge piece 134a from the axially inner side 412a of the split ring 132a to complete assembly of the first end ring 130a. With the first gasket 136a inserted into the first split ring 132a and the first bridge piece 134a, the axially outer surface 438a can be in facing engagement with the inner radial shoulder 434a of the first split ring 132a and the inner radial shoulder 444a of the first bridge piece 134a. With the first gasket 136a positioned within the first split ring 132a, the first bridge piece 134a can be retained within the first split ring 132*a* by preventing removal of the outer radial shoulder 440*a* from the groove 332*a*. The outer gasket surface 436*a* can be positioned in facing engagement with the arcuate portion 430*a* of the first split ring 132*a* and the arcuate portion 442*a* of the first bridge piece 134*a*. Mounting the first end ring 130*a* on the flange 114*a* of the coupling body 110 can position the axially inner surface 538*a* of the gasket 136*a* in facing contact with the axially outer surface 414*a* of the flange 114*a*, as shown and further described with respect to FIG. 5.

The first split ring 132*a* can be circumferentially constricted to the tensioned state by drawing the first ring end 138*a* and the second ring end 138*b* together, thereby increasing tension within the first split ring 132*a*. The first ring end 138*a* can be drawn towards the second ring end 138*b* by tensioning the tensioner 176 (shown in FIG. 3) of the bar linkage 170 (shown in FIG. 3), to reduce the gap 400*a*. Circumferentially constricting the first split ring 132*a* can compress the first gasket 136*a* radially inward, such as to form a seal with the outer pipe surface 204*a* (shown in FIG. 3) of the first pipe length 202*a* (shown in FIG. 3). The first bridge piece 134*a* can prevent the first gasket 136*a* from bunching, kinking, or bulging through the gap 400*a* during circumferential constriction.

Figure 5:
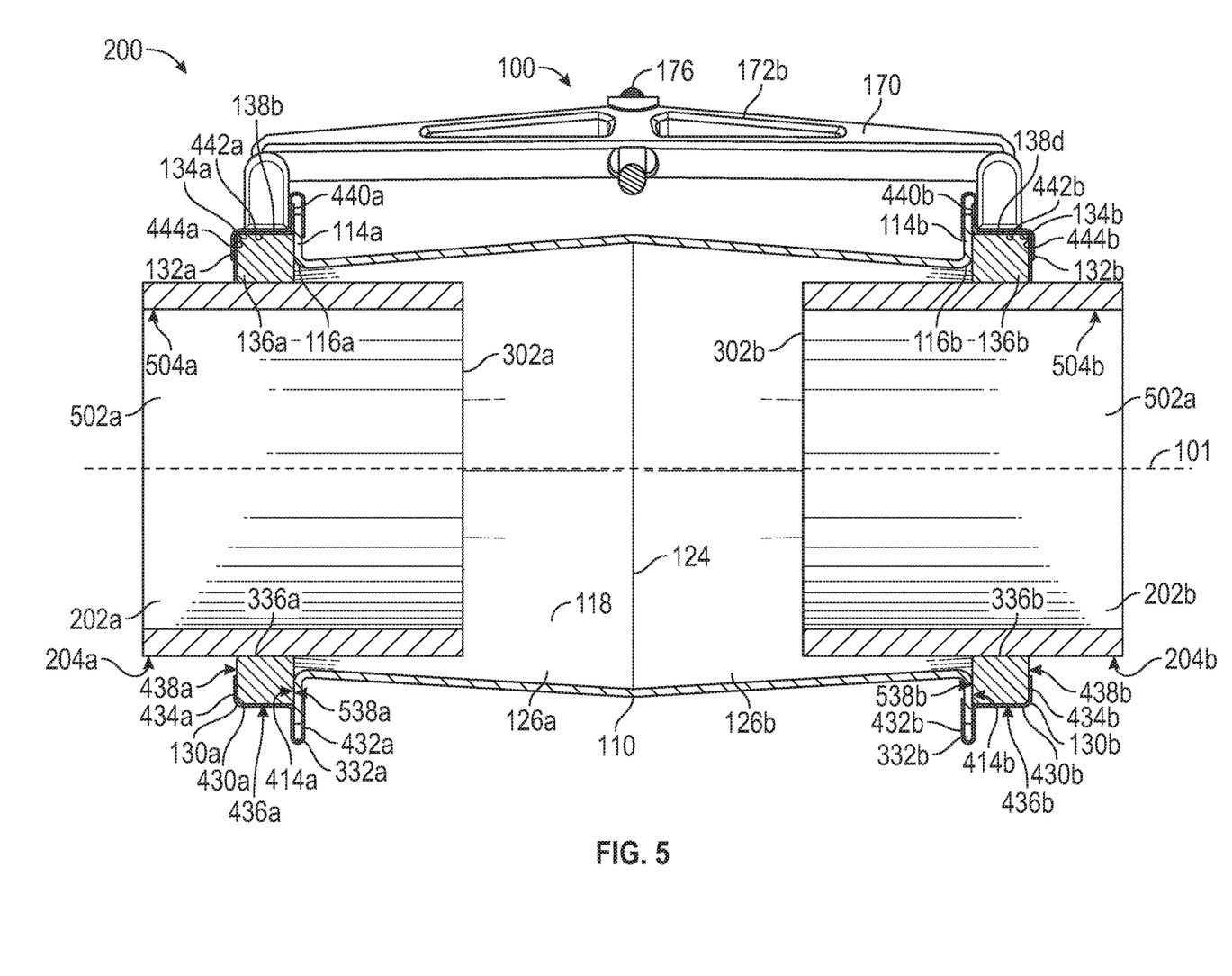
FIG. 5 is a cross-section of the pipe connection assembly of FIG. 2 taken along line 5-5 shown in FIG. 2 with the top bar coupling engaged with the first pipe length and second pipe length.

FIG. 5 is a cross-section of the pipe connection assembly 200 of FIG. 2 taken along line 5-5 shown in FIG. 2 which aligns with the second ring ends 138*b,d*. In the present aspect, the bar linkage 170 can be in the engaged position, and each of the split rings 132*a,b* can be in the tensioned state.

In the tensioned state, the first split ring 132*a* can be circumferentially constricted around the first gasket 136*a* and the first bridge piece 134*a*, thereby reducing the diameter of the first split ring 132*a*, and the first gasket 136*a* can be radially compressed between the outer pipe surface 204*a* of the first pipe length 202*a* and either the arcuate portion 430*a* of the first split ring 130*a* or the arcuate portion 442*a* of the first bridge piece 134*a*. Engagement between the flange 114*a* and the groove 332*a* can prevent the first split ring 132*a* from warping or deforming during tensioning of the tensioner 176 and circumferential constriction of the first split ring 132*a*.

The radial compression of the first gasket 136*a* can cause the gasket bore 336*a* to form a seal with the outer pipe surface 204*a*. Radial compression of the first gasket 136*a* additionally can cause the first gasket 136*a* to deform and axially lengthen due to von Mises stress within the first gasket 136*a* and the Poisson effect. The axial lengthening of the first gasket 136*a* can be restrained between the axially outer surface 414*a* of the flange 114*a* and either the inner radial shoulder 434*a* of the first split ring 132*a* or the inner radial shoulder 444*a* of the first bridge piece 134*a*. Residual pressure between the axially outer surface 414*a* of the flange 114*a* and the axially inner surface 538*a* of the first gasket 136*a* can produce a seal between the first gasket 136*a* and the flange 114*a*.

In the tensioned state, the second split ring 132*b* can similarly be circumferentially constricted around the second gasket 136*b* and the second bridge piece 134*b*, thereby reducing the diameter of the second split ring 132*b*, and the second gasket 136*b* can be radially compressed between the outer pipe surface 204*b* of the second pipe length 202*b* and either the arcuate portion 430*b* of the second split ring 132*b* or the arcuate portion 442*b* of the second bridge piece 134*b*. The second bridge piece 134*b* can prevent the second gasket 136*b* from bulging through the gap 400*a* (shown in FIG. 4) during circumferential constriction of the second split ring 132*b*. Engagement between the flange 114*b* and the groove 332*b* can prevent the second split ring 132*b* from warping or deforming during tensioning of the tensioner 176 and circumferential constriction of the second split ring 132*b*.

The radial compression of the second gasket 136*b* can cause the gasket bore 336*b* to form a seal with the outer pipe surface 204*b*. Radial compression of the second gasket 136*b* additionally can cause the second gasket 136*b* to deform and axially lengthen due to von Mises stress within the second gasket 136*b* and the Poisson effect. The axial lengthening of the second gasket 136*b* can be restrained between the axially outer surface 414*b* of the flange 114*b* and either the inner radial shoulder 434*b* of the second split ring 132*b* or the inner radial shoulder 444*b* of the second bridge piece 134*b*. Residual pressure between the axially outer surface 414*b* of the flange 114*b* and the axially inner surface 538*b* of the second gasket 136*b* can produce a seal between the second gasket 136*b* and the flange 114*b*.

In some aspects, the axially outer surfaces 438*a,b* of the gaskets 136*a,b* can each define a sloped surface which extends radially outward and axially inward from the respective gaskets bore 336*a,b* to the respective outer gasket surface 436*a,b*. In such aspects, the arcuate portions 430*a,b* or the respective split rings 132*a,b* can each define a complimentary slope which can be configured to drive the gaskets 136*a,b* axially inward when constricting the split rings 132*a,b*. Driving the gaskets 136*a,b* axially inward can be desirable in some aspects to improve and strengthen the seals formed between the axially inner surface 538*a,b* of the respective gaskets 136*a,b* and the axially outer surfaces 414*a,b* of the respective flanges 114*a,b*.

The first pipe length 202*a* can define an inner pipe surface 504*a* disposed opposite from the outer pipe surface 204*a*, and the inner pipe surface 504*a* can define a first pipe bore 502*a* extending through the first pipe length 202*a*. The second pipe length 202*b* can define an inner pipe surface 504*b* disposed opposite from the outer pipe surface 204*b*, and the inner pipe surface 504*b* can define a second pipe bore 502*b* extending through the second pipe length 202*b*. The seals formed between the gasket bores 336*a,b* of the gaskets 136*a,b* and the outer pipe surfaces 204*a,b* of the pipe lengths 202*a,b* as well as the seals formed between the axially inner surfaces 538*a,b* of the gasket 136*a,b* and the axially outer surfaces 414*a,b* of the flanges 114*a,b* can connect the first pipe bore 502*a*, the coupling bore 118, and the second pipe bore 502*b* in sealed fluid communication. Additionally, friction from the compressed gaskets 136*a,b* acting on the outer pipe surfaces 204*a,b* can secure the pipe ends 302*a,b* within the coupling bore 118 and prevent withdrawal of the pipe ends 302*a,b* from the coupling body 110.

As previously discussed, the first portion 126*a* and the second portion 126*b* of the coupling body 110 can each define a frustoconical shape. The taper of the frustoconical shape can permit limited angular deflection of either or both of the pipe lengths 202*a,b* relative to the axis 101. Permitted angular deflection can be increased by increasing the taper of the frustoconical shape or reduced by decreasing the taper of the frustoconical shape. In some applications, the first portion 126*a* and the second portion 126*b* of the coupling body 110 may not define a taper, and the coupling body 110 can be substantially tubular which can minimize permitted angular deflection of the pipe lengths 202*a,b* relative to the axis 101.

In the present aspect, the top bar coupling 100 can be compatible with a range of outer diameters for the pipe lengths 202*a,b*. The top bar coupling 100 can also be used to join pipe lengths 202a,b defining different outer diameters, such as joining a 3" nominal pipe to a 4" nominal pipe for example and without limitation. A diameter of the bore openings 116a,b can be an upper limit for the outer diameter of compatible pipe lengths 202a,b. As shown, the gaskets 136a,b can extend radially inward from the bore openings 116a,b, and the top bar coupling 100 can accommodate pipe lengths of larger outer diameter than the pipe lengths 202a,b shown. The top bar coupling 100 can also accommodate pipe lengths of smaller outer diameter than the pipe lengths 202a,b shown. In the aspect shown, each of the grooves 332a,b provides additional clearance to further circumferentially constrict each split ring 132a,b which can further compress the gaskets 136a,b and gasket bores 336a,b radially inward.

Circumferential constriction of each split ring 132a,b is limited by either interference between the first ring ends 138a,c (shown in FIG. 1) and the second ring ends 138b,d or interference between the flanges 114a,b and the outer radial lip 432a,b of the respective split ring 132a,b. Regarding interference between the first ring ends 138a,c and the second ring ends 138b,d, once the first ring ends 138a,c contact the second ring ends 138b,d, the respective split ring 132a,b cannot be further circumferentially constricted. Regarding interference between the flanges 114a,b and the respective outer radial lips 432a,b, once the flanges 114a,b bottom out in the respective grooves 332a,b of the outer radial lips 432a,b, the respective split ring 132a,b cannot be further circumferentially constricted. In some aspects, gaskets defining an increased radial thickness compared to the gaskets 136a,b of the present can be used to further accommodate pipe lengths defining a smaller outer diameter.

Figure 6:
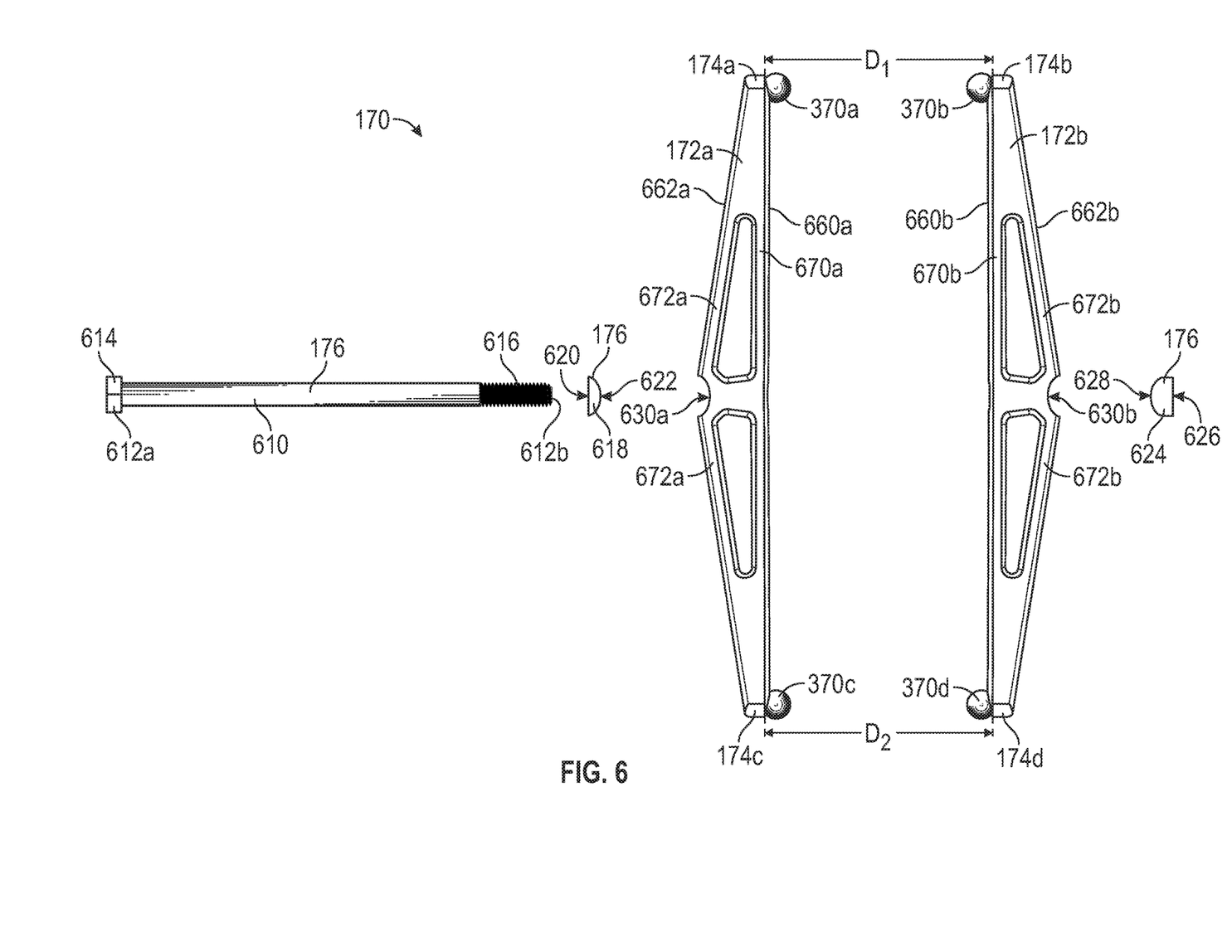
FIG. 6 is an exploded top view of the bar linkage of the top bar coupling of FIG. 1.

FIG. 6 is an exploded top view of the bar linkage 170 of FIG. 1. In the present aspect, the tensioner 176 can comprise a fastener 610, a washer 618, and a nut 624. In the present aspect, the fastener 610 can be a bolt; however in other aspects, the fastener 610 can be a different type of fastener such as a screw or any other suitable fastener. The fastener 610 can define a first end 612a and a second end 612b disposed opposite from the first end 612a. The fastener 610 can define a hexhead 614 disposed at the first end 612a. The fastener 610 can define external threading 616 disposed at the second end 612b.

The washer 618 can define a planar surface 620 and a curved surface 622 disposed opposite from the planar surface 620. The nut 624 can define a planar surface 626 and a curved surface 628 disposed opposite from the planar surface 626. In the present aspect, each of the curved surfaces 622,628 can define a convex shape, such as a longitudinal cylindrical segment. In other aspects, the curved surfaces 622,628 can define a different convex shape, such as a spherical segment, for example and without limitation. Each of the bars 172a,b can define a curved surface 630a,b which can each define a concave shape formed complimentary to the curved surfaces 622,628, such as a longitudinal cylindrical segment in the present aspect.

Each bar 172a,b can define an inner side 660a,b, respectively, and an outer side 662a,b, respectively. Each curved surface 630a,b can be defined by the respective outer side 662a,b. In the present aspect, the curved surfaces 630a,b can be defined midway between the first bar end 174a,b and the second bar end 174c,d of the respective bars 172a,b. The balls 370a,b,c,d can be disposed at the inner side 660a,b of the respective bar 172a,b. Each bar 172a,b can define a main beam 670a,b extending from the respective first bar end 174a,b to the respective second bar end 174c,d along the inner side 660a,b. Each bar 172a,b can define a pair of truss bars 672a,b extending along the outer side 662a,b between the curved surfaces 630a,b and the respective bar ends 174a,b,c,d. The truss bars 672a,b can be configured to reinforce the bars 172a,b and to prevent deflection due to loads applied by the tensioner 176. A distance $D_1$ can be defined between the first bar end 174a of the first bar 172a and the first bar end 174b of the second bar 172b. A distance $D_2$ can be defined between the second bar end 174c of the first bar 172a and the second bar end 174d of the second bar 172b.

Figure 7:
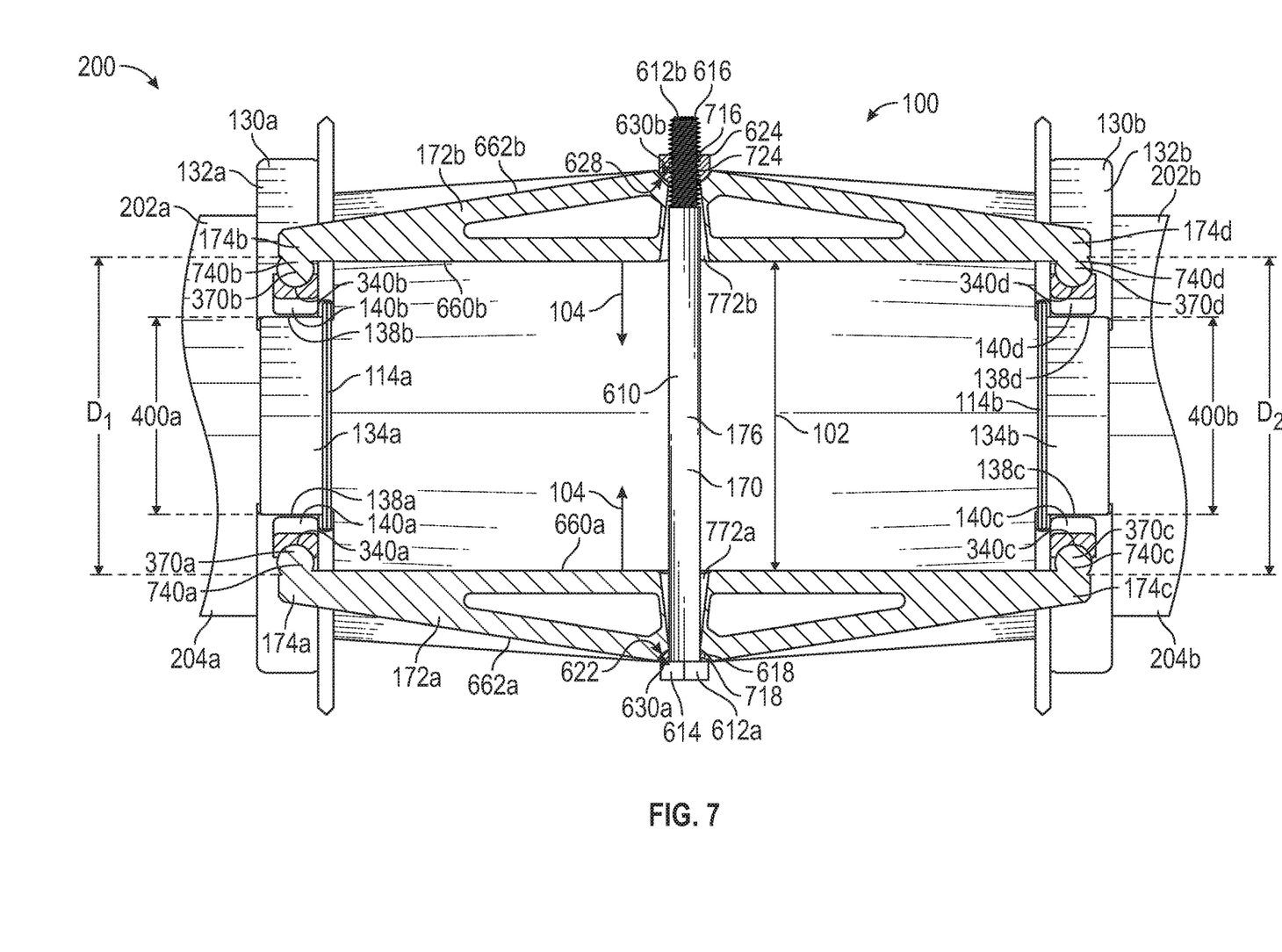
FIG. 7 is a cross-sectional view of the pipe connection assembly of FIG. 2 taken along line 7-7 shown in FIG. 2.

FIG. 7 is a cross-sectional view of the pipe connection assembly 200 of FIG. 2 taken along line 7-7 shown in FIG. 2. In the present aspect, the bar linkage 170 can be in the engaged position. The first bar 172a of the bar linkage 170 can define a bar bore 772a extending through the first bar 172a from the inner side 660a to the outer side 662a. The bar bore 772a can extend through the curved surface 630a. The bar bore 772a can taper from the inner side 660a to the outer side 662a. The second bar 172b of the bar linkage 170 can define a bar bore 772b extending through the second bar 172b from the inner side 660a to the outer side 662b. The bar bore 772b can extend through the curved surface 630b. The bar bore 772b can taper from the inner side 660b to the outer side 662b.

The curved surface 622 of the washer 618 can pivotably engage the curved surface 630a of the first bar 172a. The washer 618 can define a washer bore 718 extending through the washer 618. The curved surface 628 of the nut 624 can pivotably engage the curved surface 630b of the second bar 172b. The nut 624 can define a nut bore 724 extending through the nut 624, and in the present aspect, the nut 624 can define internal threading 716 within the nut bore 724.

The fastener 610 can extend through the bar bores 772a,b, the washer bore 718, and the nut bore 724, and the external threading 616 can threadedly engage the internal threading 716 of the nut 624. In other aspects, the bar linkage 170 may not comprise the nut 624, and the bar bore 772b can define internal threading which can engage the external threading 616. In other aspects, the nut 624 may not define the curved surface 628, and the bar linkage 170 can comprise a second washer, similar to washer 618, disposed between the nut 624 and the second bar 172b. Rotating the fastener 610 in a first direction can draw the nut 624 towards the first end 612a of the fastener 610, thereby drawing the bars 172a,b together in the tensioning direction 104 (shown in FIG. 1). Rotating the fastener 610 in a second direction, opposite from the first direction, can draw the nut 624 towards the second end 612b of the fastener 610, thereby releasing tension between the bars 172a,b and allowing the bars 172a,b to spread apart in the relaxing direction 102 (shown in FIG. 1). The bar linkage 170 can be selectively positionable about and between the engaged position and the disengaged position shown in FIG. 2.

The tensioner 176 of the bar linkage 170 can control the position of the bar linkage 170 and the tension of the split rings 132a,b. In the engaged position, the first bar 172a can be drawn towards the second bar 172b in the tensioning direction 104, thereby bringing the first bar ends 174a,b towards one another to reduce the distance $D_1$ and the second bar ends 174c,d towards one another to reduce the distance $D_2$. Movement of the bar ends 174a,b,c,d can be transferred through the ball joints 740a,b,c,d and adjacent joint bases 140a,b,c,d to the respective ring ends 138a,b,c,d. As a result, reducing the distance $D_1$ between the first bar ends 174a,b can reduce the gap 400a defined between the first ring end 138a and the second ring end 138b, thereby circumferentially constricting the first split ring 132a around the first gasket 136a (shown in FIG. 5). Similarly, reducing the distance $D_2$ between the second bar ends 174c,d can reduce the gap 400b defined between the first ring end 138c and the second ring end 138d, thereby circumferentially constricting the second split ring 132b around the second gasket 136b (shown in FIG. 5). As previously discussed, circumferentially constricting the split rings 132a,b around the gaskets 136a,b can compress the gaskets 136a,b radially inward to form a seal with the outer pipe surfaces 204a,b of the pipe lengths 202a,b.

The engagement between the curved surfaces 622,628 of the washer 618 and the nut 624, respectively, and the curved surfaces 630a,b of the bars 172a,b, respectively, can allow the tensioner 176 to pivot relative to each of the bars 172a,b. The taper of the bar bores 772a,b can provide clearance for the fastener 610 to pivot relative to each of the bars 172a,b. The balls 370a,b,c,d can each engage the concave sockets 340a,b,c,d of the adjacent joint bases 140a,b,c,d; however in other aspects, the joint bases 140a,b,c,d can define the balls 370a,b,c,d and the bars 172a,b can define the concave sockets 340a,b,c,d.

Each pair of engaged balls 370a,b,c,d and concave sockets 340a,b,c,d can define a ball joint 740a,b,c,d. The ball joints 740a,b,c,d can permit the bars 742a,b to pivot relative to the joint bases 140a,b,c,d and end rings 130a,b. In the present aspect, the ball joints 740a,b,c,d can be open ball joints 740a,b,c,d which permit the balls 370a,b,c,d to be disengaged from the concave sockets 340a,b,c,d, such as to remove the bar linkage 170 from the end rings 130a,b. In other aspects, the ball joints 740a,b,c,d can be captured ball joints which do not permit the balls 370a,b,c,d to be disengaged from the concave sockets 340a,b,c,d.

Pivoting of the tensioner 176 relative to the bars 172a,b and of the bars 172a,b relative to the end rings 130a,b can self-balance tension between the first split ring 132a and the second split ring 132b to provide uniform hoop stress through each split ring 132a,b and equal compression of each gasket 136a,b. For example, if the first split ring 132a momentarily experiences greater hoop stress than the second split ring 132b, the ball joints 740a,b proximate to the first split ring 132a can momentarily act as stationary pivots. A torque provided by the tensioner 176 can act around the ball joints 740a,b to draw the first ring end 138c towards the second ring end 138d of the second split ring 132b until hoop stress can be equalized between the split rings 132a,b.

Similarly, in applications in which the first pipe length 202a defines a larger outer diameter than the second pipe length 202b, the bars 172a,b can pivot relative to the tensioner 176 to equalize hoop stress between the split rings 132a,b. In such an application, the distance $D_1$ can be smaller than the distance $D_2$, and the gap 400b can be smaller than the gap 400a. The bars 172a,b can angle inwards from the first bar ends 174a,b towards the second bar ends 174c,d. The top bar coupling 100 therefore can provide the advantage of coupling two pipe lengths 202a,b of different diameters.

Another advantage of the top bar coupling 100 can be that the top bar coupling 100 can be attached and sealed to two pipe lengths 202a,b to form the pipe connection assembly 200 by tightening a single fastener 610. Other available pipe couplings typically require two or more fasteners to be tightened to form the pipe connection assembly 200. Tightening multiple fasteners can require additional time to install the couplings of pipe lengths. Additionally, limited access can make it difficult to reach and tighten multiple fasteners in some applications, such as installing a pipeline in a trench. Additionally, if the fasteners of a coupling are tightened to different torque levels, the seals between the coupling and the pipe lengths can be compromised due to unequal compressive stresses within the gaskets. Unequal compressive stresses can lead to wrinkles or kinks within the gaskets which can lead to leaks in the seal.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A top bar coupling comprising:
   a coupling body defining a first body end and a second body end, a coupling bore defined extending through the coupling body from the first body end to the second body end;
   a first end ring attached to the first body end, the first end ring comprising a first gasket and a first split ring, the first gasket disposed within the first split ring, the first split ring defining a first ring end and a second ring end, the first split ring configured to compress the first gasket radially inward in a tensioned state;
   a second end ring attached to the second body end, the second end ring comprising a second gasket and a second split ring, the second gasket disposed within the second split ring, the second split ring defining a first ring end and a second ring end, the second split ring configured to compress the second gasket radially inward in a tensioned state; and
   a bar linkage attached to the first end ring and the second end ring, the bar linkage comprising:
   a first bar, the first bar extending between the first ring end of the first end ring and the first ring end of the second end ring;

a second bar, the second bar extending between the second ring end of the first end ring and the second ring end of the second end ring; and a tensioner, the tensioner attaching the first bar to the second bar, the tensioner configured to draw the first bar towards the second bar.

2. The top bar coupling of claim 1, wherein:
the first end ring further comprises a first joint base extending radially outward from the first ring end; and
the first bar engages the first joint base.

3. The top bar coupling of claim 2, wherein the first bar and the first joint base of the first end ring define a ball joint, and wherein the first bar is configured to pivot relative to the first joint base.

4. The top bar coupling of claim 1, wherein the tensioner is a bolt, and wherein the bolt extends from the first bar to the second bar.

5. The top bar coupling of claim 4, wherein the fastener is configured to pivot relative to at least a one of the first bar and the second bar.

6. The top bar coupling of claim 1, wherein:
the first bar defines a first bar end engaging the first end ring and a second bar end engaging the second end ring; and
the tensioner attaches to the first bar at a point defined between the first bar end and the second bar end.

7. The top bar coupling of claim 1, wherein the first bar, the second bar, and the tensioner define an H-shape.

8. A pipe connection assembly comprising:
a first pipe length;
a second pipe length;
a top bar coupling, the top bar coupling comprising
a coupling body defining a first body end and a second body end, a coupling bore defined extending through the coupling body from the first body end to the second body end, the coupling bore receiving the first pipe length through the first body end, the coupling bore receiving the second pipe length through the second body end;
a first end ring attached to the first body end, the first end ring securing the first pipe length to the coupling body, the first end ring comprising a first gasket, the first gasket forming a first seal with the first pipe length;
a second end ring attached to the second body end, the second end ring securing the second pipe length to the coupling body, the second end ring comprising a second gasket, the second gasket forming a second seal with the second pipe length; and
a bar linkage attached to the first end ring and the second end ring, the bar linkage comprising:
a first bar extending from the first end ring to the second end ring;
a second bar extending from the first end ring to the second end ring; and
a tensioner, the tensioner attaching the first bar to the second bar.

9. The pipe connection assembly of claim 8, wherein:
the first end ring comprises a first split ring;
the first gasket is disposed within the first split ring;
the first gasket forms the first seal with the first pipe length when the first split ring is in a tensioned state;
the second end ring comprises a second split ring;
the second gasket is disposed within the second split ring;
the second gasket forms the second seal with the second pipe length when the second split ring is in a tensioned state; and the first split ring is in the tensioned state and the second split ring is in the tensioned state when the bar linkage is in an engaged position.

10. The pipe connection assembly of claim 9, wherein:
the bar linkage is selectively positionable about and between the engaged position and a disengaged position;
a distance is defined between the first bar and the second bar; and
a value of the distance is greater in the disengaged position than a value of the distance in the engaged position.

11. The pipe connection assembly of claim 9, wherein the first gasket is radially compressed between the first pipe length and the first split ring when the first split ring is in the tensioned state.

12. The pipe connection assembly of claim 9, wherein:
the coupling body defines a first flange disposed at the first body end;
the first split ring defines a groove extending from a first ring end to a second ring end of the first split ring; and
the groove receives the first flange to attach the first split ring to the coupling body.

13. The pipe connection assembly of claim 8, wherein the tensioner extends through a bar bore defined by the first bar.

14. The pipe connection assembly of claim 13, wherein:
the tensioner comprises a washer defining a curved surface;
the first bar defines a curved surface shaped complimentary to the curved surface of the washer;
the curved surface of the washer pivotably engages the curved surface of the first bar; and
the bar bore extends through the curved surface of the first bar.

15. A pipe connection assembly comprising:
a first pipe length;
a second pipe length;
a top bar coupling, the top bar coupling comprising
a coupling body defining a first body end and a second body end, a coupling bore defined extending through the coupling body from the first body end to the second body end, the coupling bore receiving the first pipe length through the first body end, the coupling bore receiving the second pipe length through the second body end;
a first end ring attached to the first body end, the first end ring securing the first pipe length to the coupling body;
a second end ring attached to the second body end, the second end ring securing the second pipe length to the coupling body; and
a bar linkage attached to the first end ring and the second end ring, the bar linkage comprising:
a first bar extending from the first end ring to the second end ring;
a second bar extending from the first end ring to the second end ring; and
a tensioner, the tensioner attaching the first bar to the second bar, the tensioner extending through a bar bore defined by the first bar.

16. The pipe connection assembly of claim 15, wherein:
the first end ring comprises a first split ring and a first gasket disposed within the first split ring;
the first gasket forms a seal with the first pipe length when the first split ring is in a tensioned state;
the second end ring comprises a second split ring and a second gasket disposed within the second split ring;

the second gasket forms a seal with the second pipe length when the second split ring is in a tensioned state; and the first split ring is in the tensioned state and the second split ring is in the tensioned state when the bar linkage is in an engaged position.

17. The pipe connection assembly of claim 16, wherein:

the bar linkage is selectively positionable about and between the engaged position and a disengaged position;

a distance is defined between the first bar and the second bar; and a value of the distance is greater in the disengaged position than a value of the distance in the engaged position.

18. The pipe connection assembly of claim 16, wherein the first gasket is radially compressed between the first pipe length and the first split ring when the first split ring is in the tensioned state.

19. The pipe connection assembly of claim 16, wherein:

the coupling body defines a first flange disposed at the first body end;

the first split ring defines a groove extending from a first ring end to a second ring end of the first split ring; and the groove receives the first flange to attach the first split ring to the coupling body.

20. The pipe connection assembly of claim 15, wherein:

the tensioner comprises a washer defining a curved surface;

the first bar defines a curved surface shaped complimentary to the curved surface of the washer;

the curved surface of the washer pivotably engages the curved surface of the first bar; and the bar bore extends through the curved surface of the first bar.

* * * * *